Nov. 25, 1969     L. POTH     3,479,730
METHOD OF AND ASSEMBLY FOR THE JOINING OF ELEMENTS
OF DIFFERENT MATERIALS
Original Filed March 24, 1965     2 Sheets-Sheet 1

LEONHARD POTH
INVENTOR.

BY Karl G. Ross

ATTORNEY

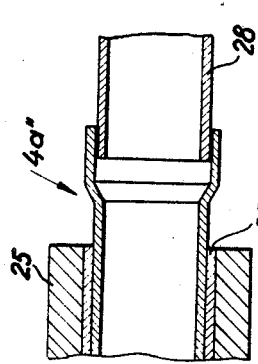
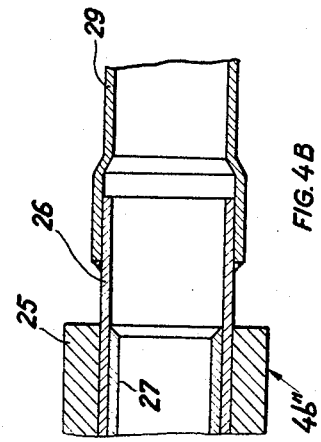
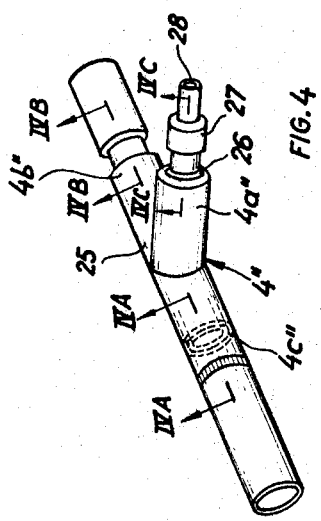
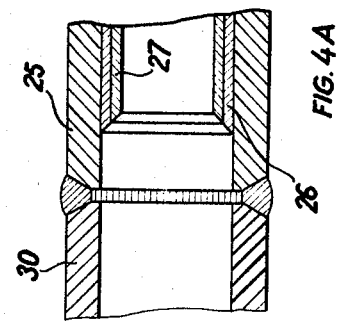
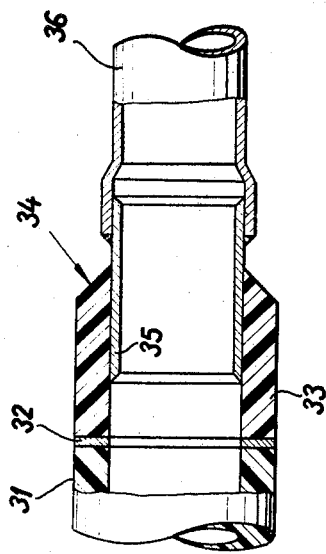

United States Patent Office 3,479,730
Patented Nov. 25, 1969

3,479,730
METHOD OF AND ASSEMBLY FOR THE JOINING OF ELEMENTS OF DIFFERENT MATERIALS
Leonhard Poth, Pullach, Isartal, Germany, assignor to Linde Aktiengesellschaft, a corporation of Germany
Continuation of application Ser. No. 442,317, Mar. 24, 1965. This application July 17, 1968, Ser. No. 747,013
Claims priority, application Germany, Mar. 25, 1964, G 40,198
Int. Cl. B23k 31/02
U.S. Cl. 29—472.1                                3 Claims

ABSTRACT OF THE DISCLOSURE

Method of joining tubular elements of difficulty bondable materials of different melting points together wherein a liminated transition piece having coaxial layers of these materials bonded together has each of the layers removed over respective annular zones and thermally welded to the respective elements to be joined with at least the higher melting-point weld securing the respective element to the corresponding layer over a narrower zone spaced from the lower melting-point layer thereby preventing thermal distortion thereof.

---

This application is a continuation of Ser. No. 442,317 filed Mar. 24, 1965, now abandoned.

The present invention relates to a method of and a device for the joining together of difficulty bondable materials and especially for connecting elements which cannot be readily fused, welded or soldered together in a direct manner.

It has long been considered a problem in the field of metal working that certain metals could not be bonded together readily by the usual fusion, welding or soldering techniques. Thus, various metals could not be welded directly to aluminum or copper, for example, unless considerable effort was employed to pretreat the bodies or otherwise render them amenable to direct welding. Other combinations of metals also evidenced this difficulty and it has hitherto been necessary, in many cases, to provide the elements to be joined with flanges or connecting portions which were then bolted or rivetted together. In the connection of pipes of difficulty bondable materials, for example, the ends of the pipes to be joined are formed with flanges interconnected by bolts and of a relatively massive character, especially for large pipes. Not only are such arrangements disadvantageous because of the complexity of the connecting portions of the elements, but the very nature of the junctions presents facile and secure sealing of a pipeline assembly in this fashion when the fluid is under considerable elevated pressures or the pipe is subjected to highly reduced pressures. In some cases, the materials to be joined are not only difficult to bond with one another but are relatively expensive so that the provision of massive junction formations and fittings at the ends of the elements is accompanied by considerable expense. Moreover, the special welding and soldering methods previously required for joining metals of the character described involve a good deal of expense and considerable labor, while nevertheless being unsatisfactory for many other reasons.

It is, therefore, the principal object of the present invention to provide an improved method of joining elements composed of metals which can be bonded together directly only with considerable difficulty.

Another object of this invention is to provide a method of the character described whereby the joining of two or more elements can be carried out with a minimum of cost and difficulty.

These objects and others which will become apparent hereinafter are attained, in accordance with the present invention, by a method of joining a plurality of elements of difficulty bondable materials together, which comprises the steps of removing from spaced junction zones of a laminated body, having superposed layers of materials compatible with the materials of the different elements, the noncompatible layers so as to permit only the corresponding compatible layer to project from the body, and bonding to this projecting portion of the compatible layer the respective element. It will be evident, therefore, than an important feature of the present invention resides in the formation of the transition body by laminating a plurality of layers together (e.g. by the rolling, pressing, explosive-bonding techniques conventionally employed for the formation of composite laminar structures and the cladding of one material with another). It has been found, in this connection, that thermal methods can be employed to connect the several elements with the respective layers at the respective junction zones without affecting the bonds between the layers or otherwise causing damage to the transition body when the layers, other than the one to be joined to each element at the respective transition zone, are cut back or removed to provide a gap between these other layers and the region at which the corresponding layer is secured to each element.

The multilayer body interconnecting two or more elements, according to the present invention can be formed from materials which are each compatible with the material of a respective one of these elements to the extent that thermal methods (e.g. welding and soldering) can be readily employed to join the corresponding layer with their elements; for the most part, however, it has been found desirable that the materials of the layers correspond to the materials of the respective elements so as to be substantially identical therewith.

According to a more specific feature of this invention, the transition body is produced by laminating the several layers into a sheet-like structure which can be cut, stamped, or punched into any desirable flat configuration. For this purpose, this body may have its junction zones at its corners while the layers other than the one to be joined to the element are cut back or removed as suggested earlier. When the transition body is to have a shape other than that of a flat plate, it can be shaped by pressing, spinning, deep-drawing or the like from such plate, preferably so as to be essentially seamless. Composite plates of this character are commercially available for almost all of the materials of primary interest in connection with the present method and assembly. These plates may be held together with the aid of special cementitous materials or by virtue of pressure bonding. For example, U.S. Patent No. 3,137,937, issued June 23, 1964, describes the formation of composite metallic bodies by various methods. Of most interest for the purpose of the present invention are those methods involving the rolling and pressing of coherent layers of the metals together and the explosive-bonding technique, constituting the principal subject matter of said patent. When references made hereinafter to clad plates, it will be understood that plates of the type produced by roll-cladding, presscladding, explosive-cladding and adhesive methods are intended although, for certain materials, the laminated structure can be formed by hot dipping, electroplating and vapor deposition according to the present invention. While multilayer bodies of shapes other than flat are, according to this invention preferably formed from the plate-like bodies, it is also possible to employ semifinished or partly fabricated and shaped body having at least a portion along which a plurality of layers have been laminated together.

According to an important feature of the present invention, when the body consists of two or more metallic layers, such layers are composed predominantly of different materials which are, however, selected from the group of iron, aluminum and copper. Thus either the base metal or substrate can consist of iron, aluminum, copper or their alloys while one or more cladding layers, which are generally of a thickness considerably less than that of the substrate, can be employed of one or more of the remaining metals of this group. It has been found, however, that metals with which the present invention may be employed, include nickel, titanium molybdenum, tantalum, chromium, zirconium, zinc, tin and their alloys.

According to still another feature of this invention, the invention is applied to the joining of chromium-nickel alloy steel and aluminum. It has, however, long been a problem in the field of low-temperature technology (cryoscopic processes, liquefaction of gases, etc.) to connect tubes of 18/8 chromium-nickel alloy steel with tubes consisting predominantly of aluminum, titanium and tantalum. Since such metals cannot be joined together by direct welding, flanges have hitherto been required; the connection of such alloy-steel tubes, appliances, and equipment in pipelines of aluminum or titanium, for example, is a common use and, by application of the principle of the present invention, considerable savings can be gained. Additional uses of the present invention in joining aluminum to alloy steels are to be found, for example, in the attachment of aluminum pipes to transport vessels for liquid gas; in this case, the present invention permits the elimination of flanges whose heat dissipation is undesirable. In the construction of chemical and nuclear reactors, it is not uncommon to connect aluminum tubes in interior of the reactor with chromium-nickel alloy steel tubes which, because of their relatively reduced thermal conductivity, can be provided advantageously on the exterior of the reactor.

The above and other objects, features and advantages of the present invention will become more readily apparent from the following description, reference being made to the accompanying drawing in which:

FIG. 4 is a perspective view of a three-way pipe-connection assembly, according to this invention;

FIG. 4A through 4C are cross-sectional views taken along lines IV-A to IV-A, IV-B to IV-B, and IV-C to IV-C; and FIG. 5 is a view similar to FIG. 2 illustrating another embodiment of the invention.

Figure 1:
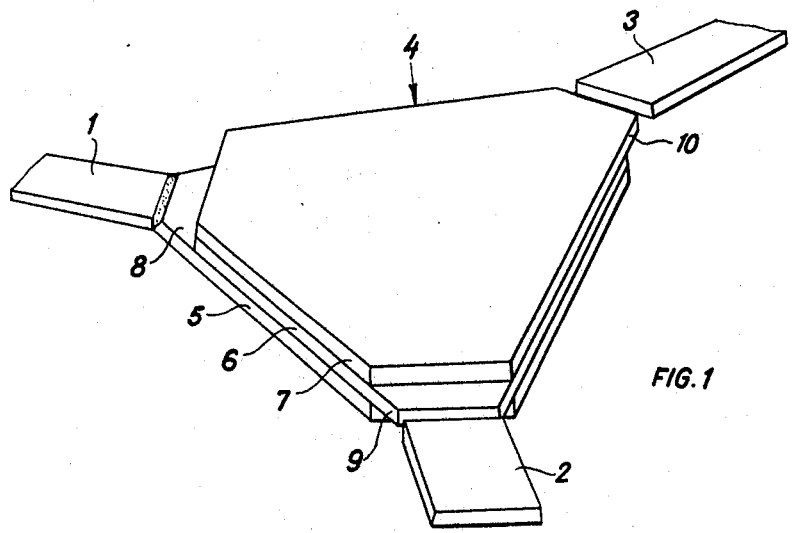
FIG. 1 is a perspective view of a plate-like transition body and the elements connectable therewith.

In FIG. 1 of the drawing, I show an assembly for the interconnection of three elements 1, 2, 3 composed of different materials and not readily bondable together by conventional means. One of these elements (e.g. element 1) can be composed, for example, of an aluminum alloy such as Al-Mg-3 while another of the elements (e.g. bar 2) can be composed of nickel-chromium alloy steel (18/8 CrNi steel). The third bar 3 can be composed of another material, e.g. titanium, tantalum or copper.

The three bars 1, 2 and 3 can be joined together, according to the present invention, with the aid of a transition body 4 consisting of layers 5, 6 and 7 of materials compatible with and readily bondable to the bars 1, 2 and 3, respectively. The body 4 can thus consist of a layer 5 on an aluminum alloy identical to that of bar 1 or a compatible alloy predominantly of aluminum, a layer 6 of a CrNi steel identical to that of bar 2 and a layer 7 of titanium, tantalum or copper, depending upon the composition of bar 3. The laminated body 4 can be produced by pressing, rolling or explosive-bonding as, for example, described in U.S. Patent No. 3,137,937 and is formed with connecting junctions 8, 9 and 10 by cutting back or removing the layers 6 and 7 from the junction 8, removing the layers 5 and 7 from the junction 9, and cutting back the layers 5 and 6 from the junction 10 to permit only the layer of a material corresponding to that of the element to project beyond the body. The removal of the layers can be effected by chemical means (e.g. etching) when care is taken to mask the areas which should remain unaffected, by mechanical means (e.g. grinding, milling, shaping or other machining), or by any other technique capable of stripping back the noncompatible layers from each of the junction zones. According to an important characteristic of the present invention, the noncompatible layers are set back by a distance sufficient to render them unaffected by the subsequent bonding operation. This operation, by which each of the elements 1, 2 and 3 are joined with the respective layers 5, 6 and 7 at the junction zones 8, 9 and 10, is preferably a thermal technique such as welding or soldering so that the stripping of the noncompatible layers should be effected to a distance sufficient to prevent distortion or damage to the remainder of the transition body by the heat and bonding materials involved. While the assembly of FIG. 1 can be formed by buttwelding the elements to their respective junction zones, generally with the deposition of a weldment deposited between the elements and their respective layers, it should be understood that lapwelding (e.g. with deposition of weldment or resistance-welding) and soldering can also be employed.

Figure 2:
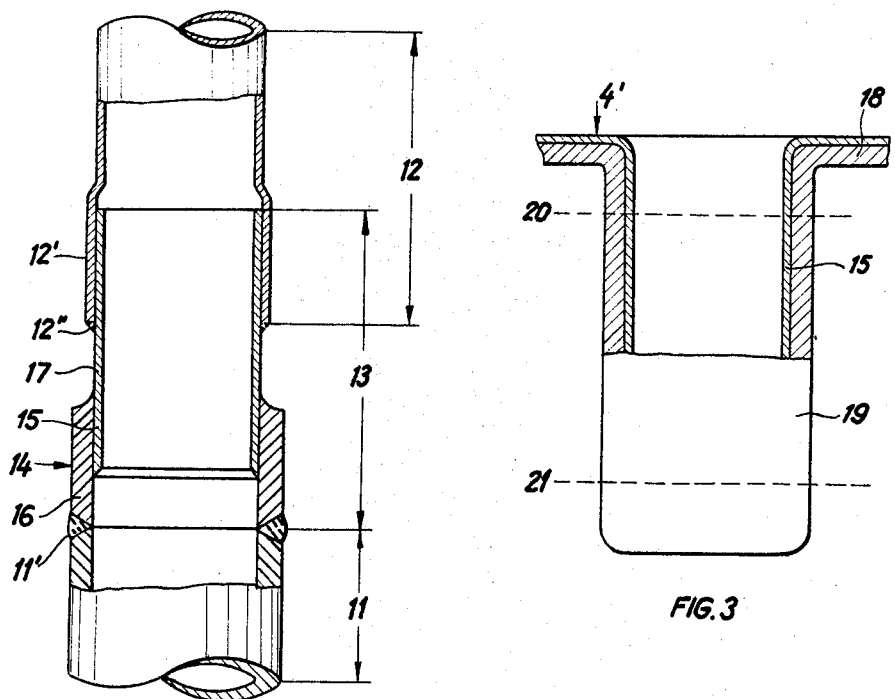
FIG. 2 is an elevational view, partly broken away, of a junction assembly according to the present invention.
Figure 3:
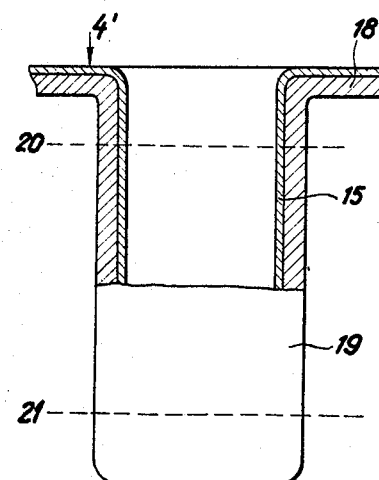
FIG. 3 is an elevational view, partially in section, showing a step in the manufacture of the transition body of FIG. 2.

In FIG. 2, there is shown a pipe assembly wherein an 18/8 CrNi steel pipe 12, which is enlarged at 12', is connected with an aluminum pipe 11. The transition body 13 is, in this case, a relatively short tube of aluminum-clad steel from which the noncompatible materials have been removed at the opposite ends of the body to permit connection of pipes 11 and 12. As illustrated in FIG. 3, the body 13 is formed by deepdrawing a plate 4, composed of the laminated layers 15 and 18 of CrNi-alloy steel and aluminum, respectively, to form a seamless cup-shaped body 19. The latter is severed at axially spaced locations 20, 21 to form an aluminum-clad nipple from which the aluminum is removed at one end by turning in a lathe while the steel layer is set back at the other end by internal boring. The resulting body 13 has a junction zone 17 of alloy steel 15 which is received within the enlargement 12' of pipe 12 and is lapwelded thereto by a weldment 12". Similarly, the junction zone 16 of the aluminum layer 14 extends beyond the laminated regions of body 13 and is buttwelded to pipe 11 by the annular deposition of a weldment 11'. It will also be apparent that, instead of a weldment 12", the interfitting layer and pipe of alloy steel can be sweat-soldered together in a conventional manner. The regions 16 and 17 are each of a length sufficient to prevent damage to the other layer by the welding or soldering operations. The assembly illustrated in FIG. 2 is useful for many purposes and can be employed, for example, for attaching CrNi-steel bodies and appliances to aluminum pipe lines.

Example

The assembly shown in FIG. 2 is made in the manner described above with a transition body in the form of a tube having a diameter of about 40 mm. The wall thickness of the tube is approximately 2.4 mm. with the aluminum layer, composed of an AlMn alloy (German Industrial Standard DIN 1725—ASA H 35.1) and has a thickness of 2.0 mm. The alloy-steel layer is composed of 18.8 CrNi-alloy steel and has a thickness of 0.4 mm. The transition body is formed by deepdrawing and machining in such manner that the steel layer (i.e. the layer having the higher tensile strength) in the interior of the body. It has been found that deepdrawing of the transition bodies in this manner prevents damage to the composite body during such deformation. The pipe 12 was an 18/8

CrNi-steel tube while the pipe 11 was composed of the aluminum alloy Al-Mg-3. The assembly was tested at room temperature to determine its sealing effectiveness against helium and was found to be less than $5 \times 10 = 10$ torr liters/second. The sealing efficiency was not reduced when the assembly was subjected to temperature stresses whereby the assembly was twice heated with a Bunsen flame to a temperature of about 200° C. alternating with four periods of cooling in liquid nitrogen. The length of the connecting piece 13 was somewhat in excess of 25 mm. The steel layer was stripped back by approximately 20% of the length of the transition body while the aluminum layer was set back somewhat in excess of 50% thereof.

In FIG. 4, I show a three-way pipe connection in which the transition body 4″ is a pipe T of aluminum alloy 25, a CrNi steel 26 and copper 27. At the extremity 4a″, the aluminum and steel outer layers are stripped back to form a junction zone of copper into which the pipe 28 is inserted (FIG. 4C) and is sweat-soldered in the manner in which copper tubing is generally joined. At another extremity 4b″ the outer layer 26 of aluminum and the inner layer 27 of copper are set back so that a junction zone only of steel extends beyond the remainder of the body. A steel alloy pipe 29 is lapwelded thereto as best seen in FIG. 4B.

At the remaining extremity 4c″, the copper and steel inner layers are set back while the aluminum layer 26 is buttwelded to an aluminum pipe 30.

In FIG. 5, there is illustrated an assembly whereby a synthetic resin pipe 31 (e.g. of polyethylene) is heat-sealed or welded at 32 to a synthetic resin layer 33 of a transition body 34, a metal layer 35 being set back from the junction zone 32 as previously described. At the projecting extremity, from which the synthetic resin is set back, a metallic pipe 36 is lapwelded to the layer 35. In general, as illustrated in FIG. 5, the present invention is also applicable to junctions between metals and non-metals, the transition body being commercially available metal-clad synthetic resin sheets.

I claim:
1. A method of joining together two tubular elements of a first and a second metal, respectively, comprising the steps of:
   forming by lamination of two substantially coextensive coaxial cylindrical layers, including an inner layer consisting of said first metal and an outer layer consisting of said second metal, a tubular transition body with a cylindrical contact surface between said inner and outer layers;
   removing an annular part of said outer layer at one end of said body to expose an annular tubular male portion of said contact surface at one end of said body while leaving an annular residue of said outer layer at the opposite end;
   fitting a tubular element made of said first metal as a socket onto the exposed portion of said surface in contact with said inner layer, but spacing the end of the socket from said annular residue of said outer layer by an annular gap whereby said tubular element of said first metal overlaps said male portion of said body;
   welding the last-mentioned tubular element onto said inner layer at a location spaced from said residue of said outer layer with a circumferential weld seam along said gap and spaced from said residue; and
   butt-welding the other tubular element onto said outer layer by a circumferential weld seam.

2. A method as defined in claim 1 wherein said inner layer is made of a metal having a higher melting point than that of said outer layer.

3. A method as defined in claim 1 wherein said body is produced by deep-drawing a sheet laminated from said first and second metals.

References Cited

UNITED STATES PATENTS

| | | | |
|---|---|---|---|
| 2,216,033 | 9/1940 | Hopkins | 29—472.1 |
| 2,763,923 | 9/1956 | Webb | 29—504 X |
| 2,786,264 | 3/1957 | Colombo | 29—472.9 X |
| 2,908,073 | 10/1959 | Dulin | 29—488 |
| 2,982,019 | 5/1961 | Drummond | 29—497.5 X |
| 3,052,016 | 9/1962 | Zimmer | 228—56 X |
| 3,109,235 | 11/1963 | Harris | 29—474.4 X |
| 3,123,447 | 3/1964 | Zimmer | 29—504 X |
| 3,137,937 | 6/1964 | Cowan. | |
| 3,284,174 | 11/1966 | Zimmer | 29—473.1 X |
| 3,315,348 | 4/1967 | Donovan | 29—473.3 X |

FOREIGN PATENTS 145,945  7/1962  Russia.

JOHN F. CAMPBELL, Primary Examiner
R. B. LAZARUS, Assistant Examiner

U.S. Cl. X. R.
29—474.3, 474.4, 474.5, 482